(12) United States Patent
Ma et al.

(10) Patent No.: US 12,510,163 B2
(45) Date of Patent: Dec. 30, 2025

(54) ELECTROMAGNETIC VALVE AND AIR CONDITIONING SYSTEM HAVING SAME

(71) Applicant: ZHEJIANG DUNAN ARTIFICIAL ENVIRONMENT CO., LTD., Shaoxing (CN)

(72) Inventors: Xiaohong Ma, Shaoxing (CN); Lian Zhang, Shaoxing (CN)

(73) Assignee: ZHEJIANG DUNAN ARTIFICIAL ENVIRONMENT CO., LTD., Shaoxing (CN)

( * ) Notice: Subject to any disclaimer, the term of this patent is extended or adjusted under 35 U.S.C. 154(b) by 1 day.

(21) Appl. No.: 18/610,397

(22) Filed: Mar. 20, 2024

(65) Prior Publication Data

US 2024/0263707 A1    Aug. 8, 2024

Related U.S. Application Data

(63) Continuation of application No. PCT/CN2022/118995, filed on Sep. 15, 2022.

(30) Foreign Application Priority Data

Sep. 29, 2021  (CN) .......................... 202122391299.6

(51) Int. Cl.
*F16K 1/14* (2006.01)
*F16K 27/02* (2006.01)
*F16K 31/06* (2006.01)

(52) U.S. Cl.
CPC .............. *F16K 1/14* (2013.01); *F16K 27/029* (2013.01); *F16K 31/0665* (2013.01)

(58) Field of Classification Search
CPC ...... F16K 1/14; F16K 31/0665; F16K 27/029; F16K 31/0655; F16K 27/0245; F25B 2341/06; F25B 41/345
See application file for complete search history.

(56) References Cited

FOREIGN PATENT DOCUMENTS

| CN | 101737545 A | 6/2010 |
|---|---|---|
| CN | 101806366 A | 8/2010 |
| CN | 102606788 A | 7/2012 |

(Continued)

OTHER PUBLICATIONS

International Search Report of PCT/CN2022/118995.
European search report of EP22874650.9.

*Primary Examiner* — Marina A Tietjen

(57) ABSTRACT

An electromagnetic valve and an air conditioning system are provided. The electromagnetic valve includes a valve sleeve and a valve body, the valve sleeve is inserted into the valve body and fixedly connected to the valve body; a spherical sealing member is capable of moving in a valve cavity in an axis of the valve sleeve and opening or sealing a valve port, and a first connecting pipe is fixedly connected to a side wall of the valve body, the first connecting pipe is in communication with the valve cavity, and the valve body is fixedly connected to a second connecting pipe extending along an axis of the valve body, the second connecting pipe is in communication with the valve port, an axis of the first connecting pipe is flush with an end of the valve port towards the spherical sealing member, or an axis of the first connecting pipe is arranged away from the second connecting pipe relative to an end of the valve port towards the spherical sealing member.

9 Claims, 2 Drawing Sheets

(56) References Cited

FOREIGN PATENT DOCUMENTS

| | | | | |
|---|---|---|---|---|
| CN | 102619991 A | | 8/2012 | |
| CN | 107035909 A | * | 8/2017 | ............ F16K 27/02 |
| CN | 113251157 A | | 8/2021 | |
| CN | 215981078 U | | 3/2022 | |
| DE | 102006062350 A1 | * | 6/2008 | ............ F16K 11/04 |
| EP | 0689015 A1 | * | 12/1995 | |
| JP | 2002250457 A | | 9/2002 | |
| JP | 2004084885 A | | 3/2004 | |
| JP | 2004239348 A | | 8/2004 | |
| JP | 4812199 B2 | | 11/2011 | |
| WO | WO-2006073043 A1 | * | 7/2006 | ......... B60H 1/00485 |

\* cited by examiner

ELECTROMAGNETIC VALVE AND AIR CONDITIONING SYSTEM HAVING SAME

CROSS-REFERENCE TO RELATED APPLICATIONS

This application is a continuation of international patent application No. PCT/CN2022/118995, filed on Sep. 15, 2022, which itself claims priority to Chinese patent application Ser. No. 202122391299.6, filed on Sep. 29, 2021, and titled "ELECTROMAGNETIC VALVE AND AIR CONDITIONING SYSTEM HAVING SAME". The content of the above identified application is hereby incorporated herein in their entireties by reference.

TECHNICAL FIELD

The present disclosure relates to the field of refrigeration technology, and in particular, to an electromagnetic valve and an air conditioning system having same.

BACKGROUND

An electromagnetic valve is an electromagnetically controlled component that is used in an industrial control system to control on-off of a medium, or to adjust parameters such as a flow direction and a flow rate of the medium, so as to achieve expected control effect.

For the electromagnetic valve in the related art, under a condition of low temperature and high pressure, because a refrigerant is too thick, a resistance in an operation process of a core iron of the electromagnetic valve is greatly increased, result in that the refrigerant is inconvenient to pass through a valve port, which increases a valve opening time and affects a working efficiency of the electromagnetic valve.

SUMMARY

According to various embodiments of the present disclosure, an electromagnetic valve and an air conditioning system having the same are provided.

The present disclosure provides an electromagnetic valve. The electromagnetic valve includes a valve sleeve and a valve body, the valve sleeve is fixedly connected with the valve body; a valve cavity is formed by enclosing an interior of the valve sleeve and an interior of the valve body, and a spherical sealing member is disposed in the valve cavity, and the spherical sealing member is capable of moving in the valve cavity along an axis of the valve sleeve and opening or sealing the valve port. A first connecting pipe is fixedly connected to a side wall of the valve body. The first connecting pipe is in communication with the valve cavity. The valve body is fixedly connected with a second connecting pipe extending along an axis of the valve body, the second connecting pipe is in communication with the valve port along an axis. And an axis of the first connecting pipe is flush with an end of the valve port towards the spherical sealing member; alternatively, an axis of the first connecting pipe is arranged away from the second connecting pipe relative to an end of the valve port towards the spherical sealing member.

In some embodiments, a distance between the axis of the first connecting pipe and the valve port is defined as H, and the distance H between the axis of the first connecting pipe and the valve port satisfies the following relationship: $0 \text{ mm} \le H \le 5 \text{ mm}$.

In some embodiments, a size of the valve port is defined as D, and the size D of the valve port satisfies the following relationship: $1 \text{ mm} \le D \le 2.5 \text{ mm}$.

In some embodiments, a material of the spherical sealing member is different from a material of the valve body.

In some embodiments, the spherical sealing member is a steel ball.

In some embodiments, an attracting member and a valve stem component are arranged in the valve cavity, and the attracting member is fixed at an end of the valve sleeve away from the valve port, the valve stem component is arranged at an end of the valve sleeve adjacent to the valve port, and the valve stem component is capable of moving towards the attracting member under an attraction of the attracting member. The valve stem component is connected with the spherical sealing member, and the valve stem component is capable of sliding in the valve cavity to cause the spherical sealing member to open or seal the valve port.

In some embodiments, the valve stem component includes a core iron and a reset spring, one end of the reset spring abuts against the attracting member, the other end of the reset spring is disposed in the core iron, and the core iron is capable of moving towards or away from the attracting member and cause the spherical sealing member to move.

In some embodiments, a shunt ring is fixed to the end of the attracting member adjacent to the core iron, and the core iron is capable of moving towards the attracting member and abuts against the shunt ring.

In some embodiments, the valve sleeve is a stainless steel sleeve, and the first connecting pipe and both the second connecting pipe are copper pipes.

The present disclosure further provides an air conditioning system, and the air conditioning system including the above electromagnetic valve are provided.

Details of one or more embodiments of this application are presented in the attached drawings and descriptions below. And other features, purposes and advantages of this application will become apparent from the description, drawings and claims.

BRIEF DESCRIPTION OF THE DRAWINGS

For a better description and illustration of embodiments and/or examples of those disclosures disclosed herein, reference may be made to one or more attached drawings. Additional details or examples used to describe the drawings should not be considered as limiting the scope of any of the disclosed disclosures, currently described embodiments and/or examples, and currently understood best modes of these disclosures.

REFERENCE SIGNS ARE AS FOLLOWS

100 represents an electromagnetic valve; 10 represents a valve sleeve; 11 represents a valve cavity; 20 represents a valve body; 21 represents a valve port; 22 represents a mounting hole; 30 represents a spherical sealing member; 40 represents a first connecting pipe; 50 represents a second connecting pipe; 60 represents an attracting member; 61 represents a shunt ring; 70 represents a valve stem component; 71 represents a core iron; 711 represents an inner hole; 72 represents a reset spring; and 200 represents an air conditioning system.

DETAILED DESCRIPTION

The technical scheme in the embodiment of this application will be described clearly and completely with the attached drawings. Obviously, the described embodiment is only a part of the embodiment of this application, not the whole embodiment. Based on the embodiments in this application, all other embodiments obtained by ordinary technicians in this field without creative work belong to the protection scope of this application.

It should be noted that when a component is considered to be "mounted" on another component, it can be directly on the other component or there can be a component in the middle. When a component is considered to be "set on" another component, it can be directly set on another component or there may be intervening components at the same time. When a component is considered to be "fixed" to another component, it can be directly fixed to another component or there may be intervening components at the same time.

Unless otherwise defined, all technical and scientific terms used herein have the same meaning as commonly understood by those skilled in the technical field of this application. The terminology used herein in the specification of this application is only for the purpose of describing specific embodiments, and is not intended to limit this application. As used herein, the term "or/and" includes any and all combinations of one or more related listed items.

Figure 1:
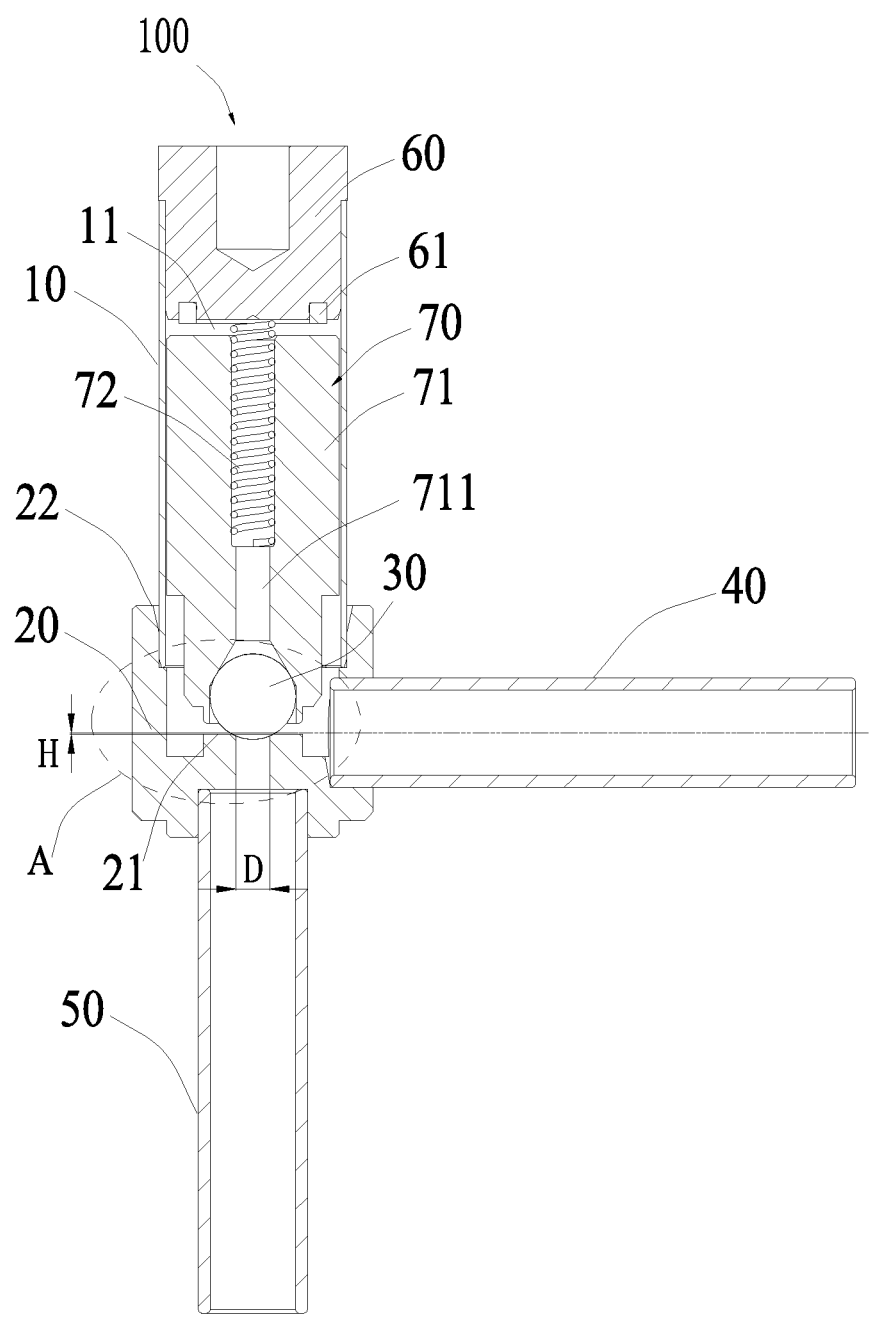
FIG. 1 is a schematic view of an electromagnetic valve according to one or more embodiments.
Figure 2:
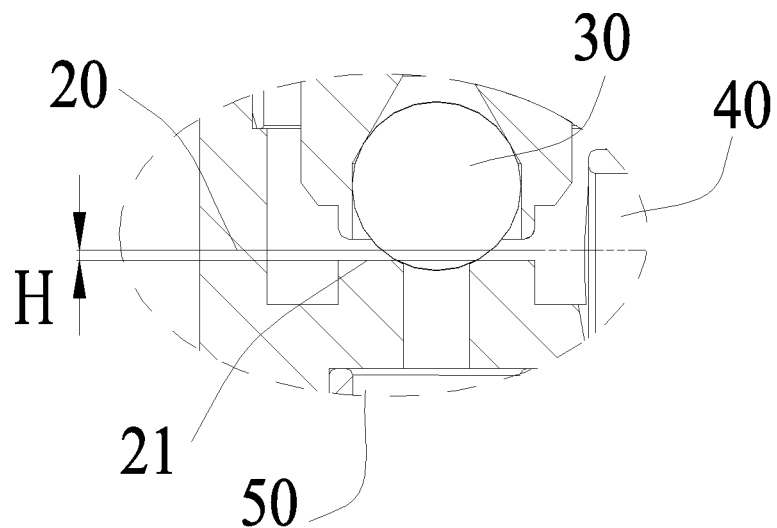
FIG. 2 is an enlarged view of portion A of the electromagnetic valve in FIG. 1.
Figure 3:
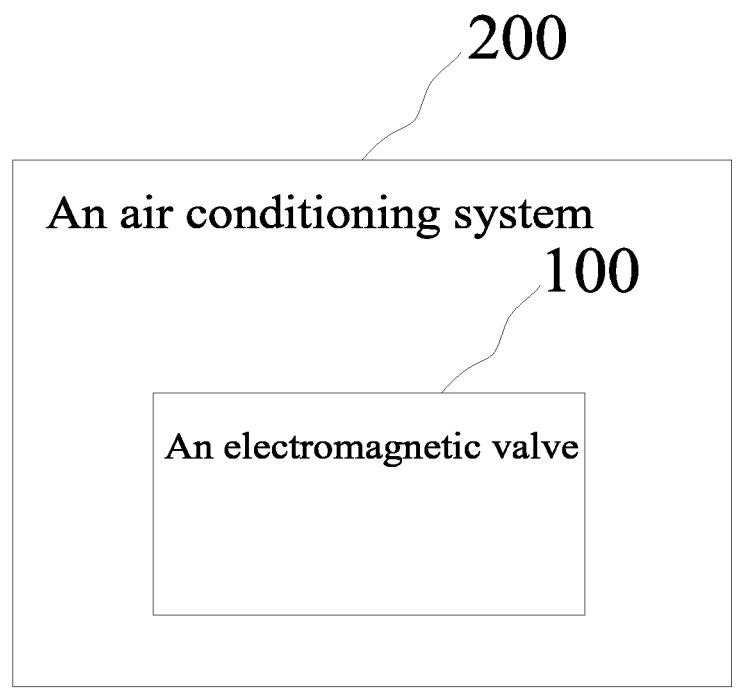
FIG. 3 is a schematic view of an air conditioning system according to one or more embodiments.

Referring to FIG. 1 to FIG. 2, the electromagnetic valve 100 is industrial equipment controlled by electromagnetism, an automatic basic element for controlling fluid, belonging to actuators, and not limited to a hydraulic actuator and a pneumatic actuator. The electromagnetic valve 100 is used in industrial control system to adjust a direction, a flow rate, a speed and other parameters of medium. The electromagnetic valve 100 can cooperate with different circuits to achieve an expected control, and a control accuracy and flexibility can be guaranteed.

In the related art, under a condition of low temperature and high pressure, a refrigerant is too thick, which leads to an inconvenience of refrigerant passing through the valve port, which increases the valve opening time and affects the working efficiency of the electromagnetic valve.

In order to solve problems existing in the electromagnetic valve in the related art, the present disclosure provides an electromagnetic valve 100 including a valve sleeve 10 and a valve body 20. The valve sleep 10 is fixedly connected with the valve body 20, and the valve sleep 10 can be inserted into the valve body 20 or sleeved outside the valve body 20. A valve cavity 11 is formed by enclosing an interior of the valve sleeve and an interior of the valve body. A spherical sealing member 30 is disposed in the valve cavity 11, the valve body 20 is provided with the valve port 21, and the spherical sealing member 30 is capable of moving in the valve cavity 11 along an axis of the valve sleeve 10 and opening or sealing the valve port 21. A first connecting pipe 40 is fixedly connected to a side wall of the valve body 20, the first connecting pipe 40 is in communication with the valve cavity 11, and the valve body 20 is fixedly connected with the second connecting pipe 50 extending along an axis of the valve body 21, the second connecting pipe 50 is in communication with the valve port 21.

In some embodiments, an axis of the first connecting pipe 40 is flush or substantially flush with an end of the valve port 21 towards the spherical sealing member 30. Specifically, the axis of the first connecting pipe 40 can be flush with an end of the valve port 21 towards the spherical sealing member 30. The axis of the first connecting pipe 40 can also be separated from an end of the valve port 21 towards the spherical sealing member 30 by a preset distance, so that the refrigerant can flow out through the valve port 21 more easily, especially at low temperature and low pressure, viscous refrigerants flow out of the valve port 21 more easily, which increases a valve opening speed of the valve port 21 and improves a working efficiency of the electromagnetic valve 100.

In some embodiments, in a direction perpendicular to the axis of the first connecting pipe 40 (i.e., the axis of the valve body 20), a position of the axis of the first connecting pipe 40 is not lower than a position of the end of the valve port 21 towards the spherical sealing member 30. Specifically, the axis of the first connecting pipe 40 can be flush with the end of the valve port 21 towards the spherical sealing member 30. Alternatively, the axis of the first connecting pipe 40 may be arranged away from the second connecting pipe 50 relative to the valve port 21 towards the spherical sealing member 30, that is, as shown in FIG. 1, a position of the axis of the first connecting pipe 40 not lower than a position of an upper end surface of the valve port 21 along the axis of the valve body 20. Of course, this is only an example, and cannot be regarded as a limitation of the present disclosure.

It should be noted that in the present disclosure, by the axis of the first connecting pipe 40 being flush with the end of the valve port 21 towards the spherical sealing member 30, it is easier for the refrigerant to flow out through the valve port 21. Alternatively, comparing with the end of the valve port 21 towards the spherical sealing member 30, the axis of the first connecting pipe 40 being arranged away from the second connecting pipe 50, it is easier for the refrigerant to flow out through the valve port 21, especially, the refrigerant with high viscosity flows out from the valve port 21 at low temperature and low pressure. Thereby, the valve opening speed of the valve port 21 is increased and the working efficiency of the electromagnetic valve 100 is improved.

In some embodiments, a distance between the axis of the first connecting pipe 40 and the valve port 21 is defined as H, and the distance H of the first connecting pipe 40 and the valve port 21 satisfies the following relationship: $0 \text{ mm} \leq H \leq 5 \text{ mm}$.

It is worth noting that if a position of the valve port 21 is too lower, the distance H between the axis of the first connecting pipe 40 and the valve port 21 will be greater, and it is undoubtedly necessary to increase a length of other components in the valve sleeve 10. If the distance H between the axis of the first connecting pipe 40 and the valve port 21 is too great, a material cost of the electromagnetic valve 100 will increase, therefore, considering the above-mentioned, the distance between the axis of the first connecting pipe 40 and the valve port 21 is $0 \text{ mm} \leq H \leq 5 \text{ mm}$, thus avoiding the material cost increase of the electromagnetic valve 100 caused by an excessively high distance H between the axis of the first connecting pipe 40 and the valve port 21.

Referring to FIG. 1, in an embodiment, the valve body 20 is provided with a mounting hole 22 for installing the valve sleep 10 in a direction of the valve sleep 10, and an end of the valve sleep 10 extends into the mounting hole 22 and is welded and fixed with the valve body 20.

In this embodiment, the valve sleeve 10 is a generally cylindrical structure, and the valve body 20 is a generally stepped cylindrical structure. Of course, the valve sleep 10 is not limited to a cylindrical structure, and the valve body 20 is not limited to a stepped cylindrical structure. In other embodiments, the valve sleep 10 and the valve body 20 can also be arranged in a square cylindrical structure, which is not limited here.

Furthermore, an attracting member 60 and a valve stem component 70 are arranged in the valve sleeve 10, and the attracting member 60 is fixed at an end of the valve sleeve 10 away from the valve port 21, the valve stem component 70 is arranged at an end of the valve sleeve 10 adjacent to the valve port 21, and the valve stem component 70 is capable of moving towards the attracting member 60 under an attraction of the attracting member 60.

Specifically, the valve stem component 70 includes a core iron 71 and a reset spring 72. An inner hole 711 is disposed in a center of the core iron 71, and the inner hole 711 penetrates through the core iron 71 and is a stepped hole. And the reset spring 72 is disposed in the inner hole 711, one end of the reset spring 72 abuts against the attracting member 60, and the other end of the reset spring 72 is accommodated in the inner hole 711 of the core iron 71. The spherical sealing member 30 is fixedly connected to an end of the core iron 71 away from the attracting member 60. Under an action of the attracting member 60, the core iron 71 can move towards or away from the attracting member 60 and cause the spherical sealing member 30 to move, such that the spherical sealing member 30 abuts against or separates from the valve port 21 to close or open the valve port 21.

A coil (not shown in the figure) is sleeved on an outer wall of the valve sleeve 10. When the coil is not energized, under an elastic force of the reset spring 72, the core iron 71 is pushed towards the valve body 20, and the spherical sealing member 30 abuts against the valve port 21 to achieve sealing. At this time, the valve port 21 is sealed, and the refrigerants in the first connecting pipe 40 and the second connecting pipe 50 are not in communication with each other. When the coil is energized, under an action of electromagnetic field, a magnetic attraction force is generated between the core iron 71 and the attracting member 60, and the core iron 71 overcomes an elastic force of the reset spring 72 and moves towards the attracting member 60. The spherical sealing member 30 is separated from the valve port 21, the valve port 21 is opened, and the refrigerant flows into the second connecting pipe 50 from the first connecting pipe 40 through the valve port 21.

Furthermore, an end of the attracting member 60 adjacent to the core iron 71 is fixedly provided with the shunt ring 61. The core iron 71 can move towards the attracting member 60 and abuts against the shunt ring 61.

It should be noted that since the electromagnetic valve 100 is in operation, the core iron 71 will be continuously attracted by the attracting member 60, move towards the attracting member 60 and abut against the attracting member 60, therefore, in order to reduce a noise generated by the electromagnetic valve 100 in an operating process, in this embodiment, the shunt ring 61 which is capable of abutting against the core iron 71 is arranged on the attracting member 60, so as to achieve an effect of reducing the noise generated by the electromagnetic valve 100 in the operating process.

Furthermore, a size of the valve port 21 is defined as D, and the size D of the valve port 21 satisfies the following relationship: $1\ mm \leq D \leq 2.5\ mm$. The size D of the valve port 21 is too great, which will lead to a poor sealing performance of the spherical sealing member 30 when it is plugged in the valve port 21. If the size D of the valve port 21 is too small, a circulation of refrigerant will not be guaranteed, so to avoid the above mentioned phenomena, it is necessary to limit the size D of the valve port 21 to a suitable range of greater than or equal to 1 mm and less than or equal to 2.5 mm.

Of course, in other embodiments, the size D of the valve port 21 can be adjusted as required, and is not limited here.

In some embodiments, a material of the spherical sealing member 30 is different from a material of the valve body 20. Since the spherical sealing member 30 moves in the direction of the valve port 21 and abuts against the valve port 21 during the operation process of the electromagnetic valve 100, if the spherical sealing member 30 and the valve body 20 are made of same material, the spherical sealing member 30 and the valve body 20 are prone to wear and tear during contact, resulting in loss, thus affecting a sealing performance of the spherical sealing member 30 abutting against the valve port 21. Therefore, to avoid the above mentioned phenomena, in this embodiment, the spherical sealing member 30 and the valve body 20 are made of different materials, so that when the spherical sealing member 30 abuts on the valve body 20, an abrasion between the spherical sealing member 30 and the valve body 20 is reduced, thereby enhancing the sealing performance of the spherical sealing member 30 abutting against the valve port 21.

In this embodiment, the spherical sealing member 30 is a steel ball. In this way, the valve body 20 should be made of materials other than steel. Of course, in other embodiments, the spherical sealing member 30 can also be made of other materials such as aluminum, which is not limited here.

In an embodiment, the valve sleeve 10 is a stainless steel sleeve, and the first connecting pipe 40 and both the second connecting pipe 50 are copper pipes. Of course, in other embodiments, the valve sleeve 10, the first connecting pipe 40 and the second connecting pipe 50 can also be made of other materials such as aluminum, which is not limited here.

It should be noted that in this embodiment, referring to FIG. 1, for example, the electromagnetic valve 100 is set to be installed vertically, the first connecting pipe 40 as an inlet pipe, and the second connecting pipe 50 as an outlet pipe. taking this arrangement as an example, a circulation process of the electromagnetic valve 100 is briefly described.

During the operation process of the electromagnetic valve 100, when the valve port 21 is opened, the refrigerant flows into the electromagnetic valve 100 from the first connecting pipe 40. Most of the refrigerant can flow directly downward into the valve port 21 and then flow into the second connecting pipe 50 through the valve port 21. Referring to FIG. 1, the position of the axis of the first connecting pipe 40 not lower than the position of the upper end face of the valve port 21 along the axis of the valve body 20, so that the refrigerant in the first connecting pipe 40 can smoothly and quickly flow into the valve port 21. It reduces a resistance and time required for viscous refrigerant when flowing through the valve port 21 at low temperature and low pressure, thus improving the working efficiency of the electromagnetic valve 100.

The present disclosure further provides an air conditioning system 200 including the above electromagnetic valve 100 provided.

The technical features of the above-mentioned embodiments can be combined arbitrarily. In order to make the description concise, not all possible combinations of the technical features are described in the embodiments. However, as long as there is no contradiction in the combination of these technical features, the combinations should be considered as in the scope of the present disclosure.

One of ordinary skill in the art should recognize that the above embodiments are used only to illustrate the present disclosure and are not used to limit the present disclosure, and that appropriate variations and improvements to the above embodiments fall within the protection scope of the present disclosure so long as they are made without departing from the substantial spirit of the present disclosure.

What is claimed is:

1. An electromagnetic valve, comprising a valve sleeve and a valve body, wherein the valve sleeve is fixedly connected with the valve body; a valve cavity is formed by enclosing an interior of the valve sleeve and an interior of the valve body, and a spherical sealing member is disposed in the valve cavity; the valve body is provided with a valve port, and the spherical sealing member is capable of moving in the valve cavity along an axis of the valve sleeve and opening or sealing the valve port;

wherein a material of the spherical sealing member is different from a material of the valve body, a first connecting pipe is fixedly connected to a side wall of the valve body, the first connecting pipe is in communication with the valve cavity, the valve body is fixedly connected with a second connecting pipe extending along an axis of the valve body, the second connecting pipe is in communication with the valve port, and a distance between an axis of the first connecting pipe and an end of the valve port towards the spherical sealing member is defined as H, the distance H between the axis of the first connecting pipe and the valve port towards the spherical sealing member satisfies the following relationship: $0 \text{ mm} < H \leq 5 \text{ mm}$.

2. The electromagnetic valve of claim 1, wherein a size of the valve port is defined as D and the size D of the valve port satisfies the following relationship: $1 \text{ mm} \leq D \leq 2.5 \text{ mm}$.

3. The electromagnetic valve of claim 1, wherein the spherical sealing member is a steel ball.

4. The electromagnetic valve of claim 1, wherein an attracting member and a valve stem component are arranged in the valve cavity, and the attracting member is fixed at an end of the valve sleeve away from the valve port, the valve stem component is arranged at an end of the valve sleeve adjacent to the valve port, and the valve stem component is capable of moving towards the attracting member under an attraction of the attracting member; the valve stem component is connected with the spherical sealing member, and the valve stem component is capable of sliding in the valve cavity to cause the spherical sealing member to open/seal the valve port.

5. The electromagnetic valve of claim 4, wherein the valve stem component comprises a core iron and a reset spring, one end of the reset spring abuts against the attracting member, the other end of the reset spring is disposed in the core iron, and the core iron is capable of moving towards or away from the attracting member to cause the spherical sealing member to move.

6. The electromagnetic valve of claim 5, wherein a shunt ring is fixed to the end of the attracting member adjacent to the core iron, and the core iron is capable of moving towards the attracting member and abuts against the shunt ring.

7. The electromagnetic valve of claim 1, wherein the valve sleeve is a stainless steel sleeve, and both the first connecting pipe and the second connecting pipe are copper pipes.

8. An air conditioning system, comprising the electromagnetic valve of claim 1.

9. An electromagnetic valve, comprising a valve sleeve and a valve body, wherein the valve sleeve is fixedly connected with the valve body; a valve cavity is formed by enclosing an interior of the valve sleeve and an interior of the valve body, and a spherical sealing member is disposed in the valve cavity; the valve body is provided with a valve port, and the spherical sealing member is capable of moving in the valve cavity along an axis of the valve sleeve and opening or sealing the valve port;

wherein a first connecting pipe is fixedly connected to a side wall of the valve body, the first connecting pipe is in communication with the valve cavity, the valve body is fixedly connected with a second connecting pipe extending along an axis of the valve body, the second connecting pipe is in communication with the valve port, and a distance between an axis of the first connecting pipe and an end of the valve port towards the spherical sealing member is defined as H, the distance H between the axis of the first connecting pipe and the valve port towards the spherical sealing member satisfies the following relationship: $0 \text{ mm} < H \leq 5 \text{ mm}$; and a material of the spherical sealing member is different from a material of the valve body.

* * * * *